United States Patent [19]
Carlstein et al.

[11] 4,386,902
[45] Jun. 7, 1983

[54] MACHINE FOR HANDLING OR TREATING PLASTIC MATERIAL

[75] Inventors: Jan Carlstein, Mariestad; Sven Jonsson, Laxå, both of Sweden

[73] Assignee: Fjellman Press AB, Sweden

[21] Appl. No.: 269,050

[22] PCT Filed: Oct. 2, 1980

[86] PCT No.: PCT/SE80/00239
§ 371 Date: Jun. 2, 1981
§ 102(e) Date: May 20, 1981

[87] PCT Pub. No.: WO81/00983
PCT Pub. Date: Apr. 16, 1981

[30] Foreign Application Priority Data
Oct. 2, 1979 [SE] Sweden .................. 7908162

[51] Int. Cl.³ ............................................. B29G 3/50
[52] U.S. Cl. .................................. 425/558; 425/560; 264/328.17
[58] Field of Search ................. 264/328.17, DIG. 65; 425/560, 558

[56] References Cited
U.S. PATENT DOCUMENTS 2,327,079  8/1943  Wacker .................. 264/328.17
2,338,607  1/1944  Wacker .................. 264/DIG. 65
3,268,636  8/1966  Angell .................... 425/560 X Primary Examiner—Thomas P. Pavelko
Attorney, Agent, or Firm—McGlew and Tuttle

[57] ABSTRACT

A machine for treating or processing, e.g. injection moulding or extruding, plastic material which is available in packaged form said machine comprising, in a manner known per se, an extrusion nozzle (7, 9) and a feed channel (23) connected thereto, is combined with a device (31) for emptying the packages into said feed channel by deformation of the package (71). Before the emptying exit openings may be provided in the packaging material by means of special perforating members (93 to 97). The deformation and the emptying of the package takes place in a cylinder (47) by means of a piston (45) fitting therein and driven by means of pressurized fluid.

11 Claims, 8 Drawing Figures

MACHINE FOR HANDLING OR TREATING PLASTIC MATERIAL

FIELD AND BACKGROUND OF THE INVENTION

When handling or treating plastic material, which in the form of raw material contains substances that may be toxic or may cause allergy symptoms of the work-people, the material, up to the time it is fed into the machine, must be packed in a packaging material preventing the emission of said substances. At the time of feeding the material into the machine, the packages are usually opened manually, and even if this takes place with great care there are great risks that sufficient amounts of said substances shall be emitted in order to cause injuries or inconveniences to the work-people.

SUMMARY OF THE INVENTION

The object of the present invention is to provide a machine for handling or treating, especially moulding or extruding or dosage of plastic material which is available in packed form, in which machine the emission of harmful substances from the plastic material is prevented to the largest possible extent.

Another object of the invention is to provide a machine in which the opening of the package before its emptying takes place automatically under lowest possible emission of harmful substances from the material.

A further object of the invention is to provide a machine having means for conveniently and quickly charging the packages containing plastic material.

A machine according to the invention for handling or treating especially moulding, extruding or dosage of plastic material which is available in packed form comprises a nozzle and a feed channel for feeding the plastic material directly or indirectly to the nozzle, and is characterized by a device for emptying a package containing plastic material into said feed channel by deformation of the package after an outlet opening for the plastic material has been provided in the packaging material.

While the device for emptying the plastic material may in some cases serve as extruder the machine according to the invention preferably comprises a separate extrusion unit with an extrusion cylinder and a switch valve adapted to alternatively connect the extrusion cylinder with said feed channeland said nozzle.

The device for emptying the packages suitably comprises an emptying cylinder for accomodating the package and a driven, emptying piston slidable in and tightly fitting against the walls of said cylinder. In such case said extrusion unit can comprise a feeding head into which said feed channel opens and against which the emptying cylinder can be brought to tightly abut. The unit consisting of the emptying cylinder and the emptying piston and the driving means for the latter can be shiftable, suitably swingable, between a loading position in which a plastic package can easily be fed into the cylinder, and an emptying position in which the emptying cylinder is tightly connected to the feeding head. The active end surface of the emptying cylinder can suitably have a portion of reduced cross section for the formation of a peripheral groove between said portion and the wall of the emptying cylinder, said groove accomodating the mantle portion of the packaging material which is collapsed at the compression of the package containing plastic material.

BRIEF DESCRIPTION OF THE DRAWINGS

The invention will be described in more detail hereinbelow with reference to the accompanying drawings in which.

DESCRIPTION OF THE PREFERRED EMBODIMENT

Figure 1:
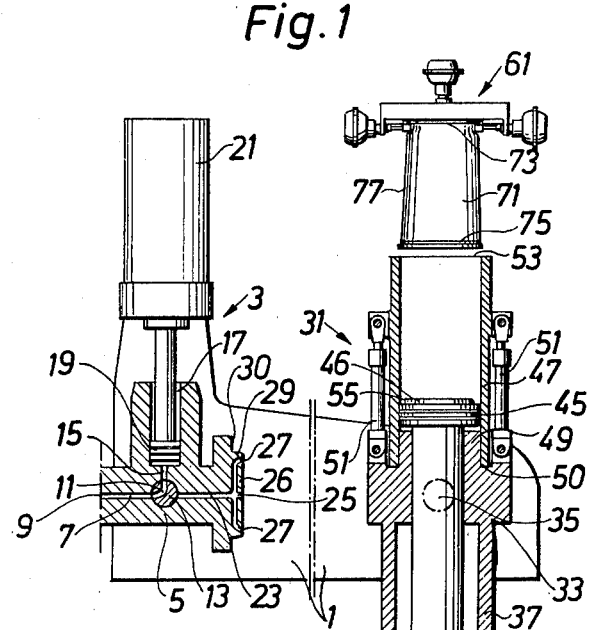
FIGS. 1 and 2 show part of an embodiment of a machine according to the invention, partly in a vertical side section, and with an emptying unit for plastic packages comprised in the machine in a position for loading packages.

The machine shown in the drawings comprises a support 1 which can form part of the frame of the machine. The support 1 supports an injection unit 3 and a device 31 for emptying plastic material packages. The machine according to the invention comprises of course further devices and details such as driving and control devices, sensing devices, injection nozzles or mould holders, regulating equipment etc., all according to the intended use, but such devices may be of conventional type and have not therefore been shown in a detailed manner.

The extrusion or injection unit 3 comprises an injector body 5 having an outlet injection nozzle 7 the mouth 9 of which being in a conventional manner but not shown connectable to for instance the injection opening of a mould. The body 5 also comprises a switch valve 13 having an internal through-going channel 11. The valve body 13 is rotatable about an axis perpendicular to the plane of the paper. Beyond the injection channel 7 the valve 13 has connected to it also a feed channel 23 for plastic material and an outlet channel 15 from an injection cylinder 17 in which slides an injection piston 19 which is driven by a hydraulic cylinder 21. In the position of the valve 13 as shown in FIG. 1 the internal channel 11 thereof connects the injection nozzle with the outlet channel 15 from the injection cylinder. Rotation 90° clockwise according to the drawing will have the evident effect that the channel 11 connects the feed channel 23 with the channel 15 of the injection cylinder.

The feed channel extends from a feeding head 29 in which it communicates with a central channel 25 and two branch channels 27 all having an end opening situated in a plane surface 26 of the feeding head which also comprises abutment surfaces 30. Typically the feeding head has a circular cross section.

The emptying unit 31 comprises a body 33 which is journalled in bearings at the support 1 of the machine by means of an axis 35 extending perpendicularly to the plane of the drawing. At the lower portion thereof the body 33 is provided with a cylinder 37 in which a piston 39 on a piston rod 41 is slideable. The space of the cylinder below the piston 39 is intended to have fed to it fluid under pressure via a feed channel 43. The upper end of the piston rod 41 is connected to a piston 45 movable in a cylinder 47 which is intended to be charged with plastic material packages 71. The free end portion 46 of the piston has a somewhat reduced diameter as compared with the rest of the piston 45 so that a ring-formed peripheral space 55 is formed, the purpose of which will be described later.

Figure 2:
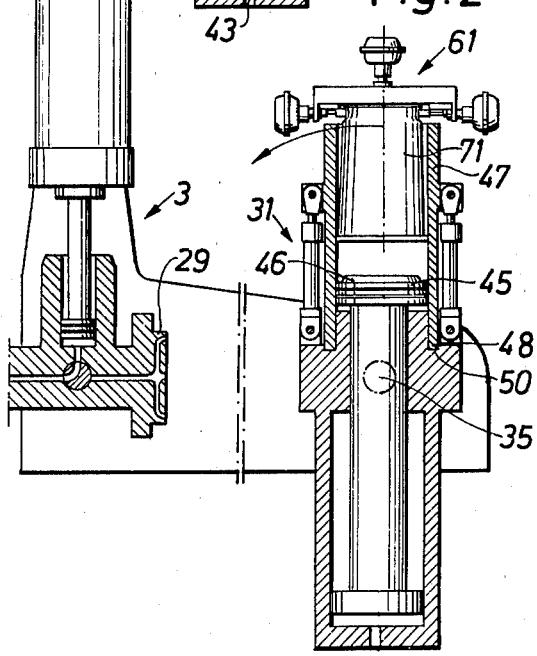
Figure 3:
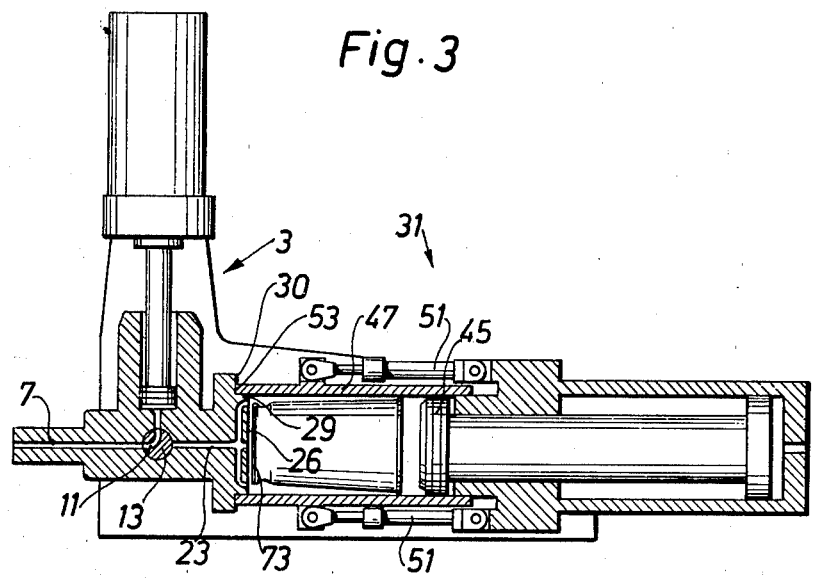
FIGS. 3, 4 and 5 illustrate the machine with the emptying unit in a position for starting, continuing and completed emptying of a plastic package.
Figure 8:
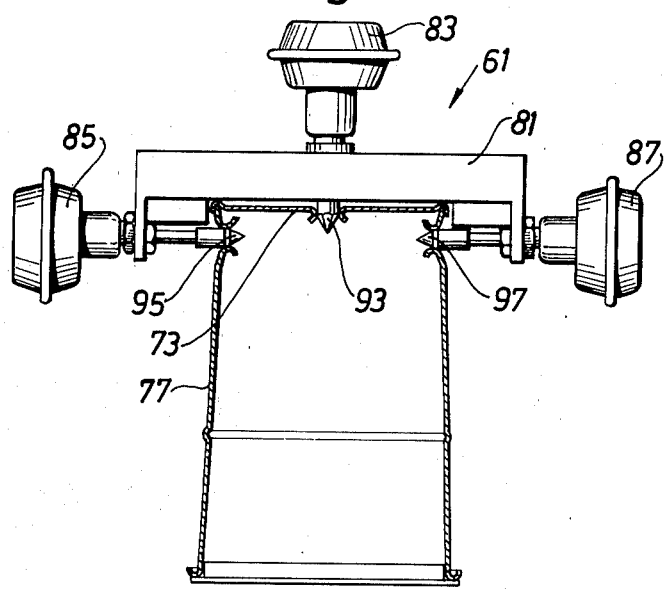

The cylinder 47 is axially displaceable on an upper, ring-formed portion 49 of the body 33 the displacement being effected by means of hydraulic cylinders 51 coupled between the cylinder 47 and the body 33. The upper surface of the cylinder 47 is designated with 53. In the position of the emptying unit 31 as shown in FIGS. 1 and 2 the mouth of the cylinder 47 is facing upwardly for receiving a plastic package 71. The latter is charged into the cylinder by means of a charging unit 61 which comprises a body portion 81 (FIG. 8) and three pressure boxes 83, 85 and 87 mounted to the body portion 81 and provided with pins 93, 95 and 97 respectively adapted at the feeding of pressure medium to the boxes 83 and 87 push out against and penetrate the wall of the package 71. The packaging material will thus be provided with corresponding openings through which the plastic material can flow out from the package at the subsequent emptying thereof. The pins 95 and 97 serve at the same time as gripping members for holding the package during the transfer thereof from a package delivery place to the position above the emptying cylinder 47 shown in FIG. 1. When the latter position has been reached the device 61 is actuated to be lowered so that the package 71 is introduced into the cylinder 47. Thereafter the pressure boxes 85 and 87 are actuated so that the pins 95 and 97 release the package whereby the latter falls down on the top 46 of the piston 45.

The emptying unit 31 is now swung clockwise 90° so that the geometrical axis of the cylinder 47 coincides with the geometrical axis of the feeding head 29 whereby the position of the unit 31 according to the FIGS. 3 to 6 is achieved. In the position according to FIG. 3 the cylinder, after the swing-down of the unit 31, has been moved to the left according to the Figure by means of the hydraulic cylinders 51, so that the top surface 53 of the cylinder 47 has come into abutment against the circular abutment surface 30 of the feeding head whereby the forward end portion of the cylinder 47 tightly encloses the feeding head 29.

Figure 4:
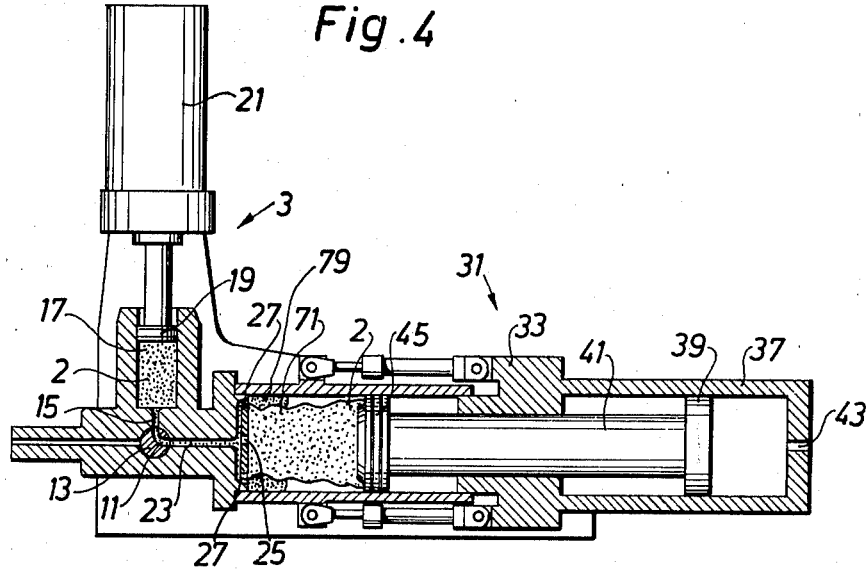

When this position has been reached, or before, the valve 13 of the unit 3 is shifted into the position shown in FIG. 4, in which the valve channel 11 connects the feed channel 23 with the channel 15 to the injection cylinder 17. The emptying of the plastic material package 71 can now take place by moving the piston 45 to the left as seen in FIG. 4 by means of pressurized fluid directed to the cylinder 37 through the channel 43 and acting on the piston 39, the piston rod 41 of which is guided in the body 33. The emptying is carried out under compression or collapse of the mantle surface of the packaging material in a manner illustrated in FIG. 4, the plastic material in the package escaping from the perforations made by the pins 93 to 97 in the manner described above. The plastic material flows out through the channels 25, 27 and 23 and through the valve channel 11 and the channel 15 and fills successively the injection cylinder 17 until the latter has received the desired amount of plastic material. Thereafter the valve 11 is shifted by rotation anti-clockwise so that the channel 11 interconnects the channels 15 and 7. Thereafter the hydraulic cylinder 21 is actuated so that the plastic material in the cylinder 17 is injected with a high pressure via the injection nozzle 9 into the mould or extrusion opening to which the nozzle is connected in each particular case.

When the cylinder 17 has been emptied the valve 13 is switched by rotating clockwise 90° whereby the cylinder 17 is again connected with the feed channel 23. Now the piston 45 of the emptying unit 31 is further activated for renewed filling of the injection cylinder 17 whereby the mantle surface 77 of the packaging material is still more deformed. During the compression of the package a portion, designated by 79, of the plastic material can penetrate into the interspace between the cylinder 47 and the package. However, this material will eventually likewise by forced out of the channels in the feeding head.

Figure 5:
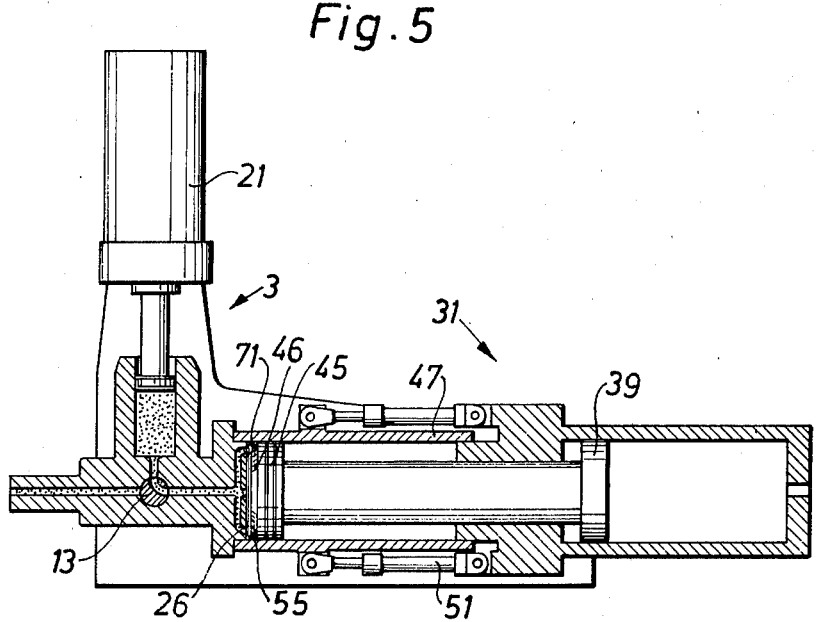

After a number of operations for filling and emptying the injection cylinder 17 in this manner the package has been finally wholly emptied, and the piston 45 is then in its left end position according to FIG. 5 in which the piston portion 46 is spaced from the end portion of the feeding head 26 only by the cover 73 and the bottom 75 of the packaging material. The mantle surface 77 of the packaging material is now wholly compressed and is narrowly received in the ring-formed space 55 between the end portion 46 of the piston 45 and the emptying cylinder 47.

Figure 6:
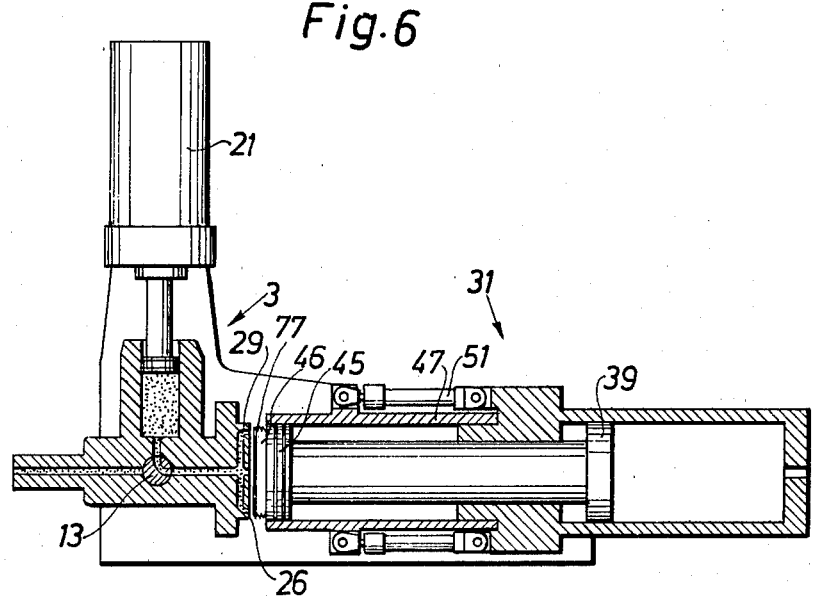
FIG. 6 illustrates the machine with the emptying unit in a position immediately before the ejection of an emptied package.
Figure 7:
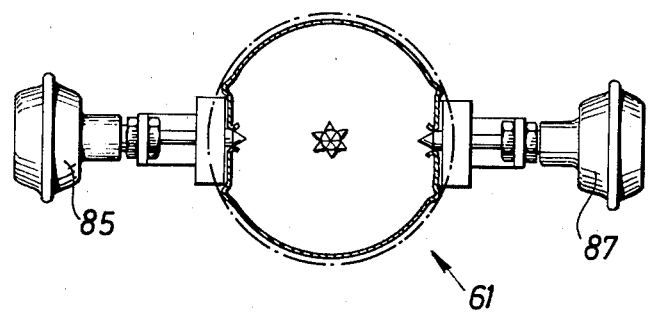
FIGS. 7 and 8 illustrate partially and in plane view and side elevation respectively a device for gripping and perforating a plastic material package.

The totally deformed packaging material must now be removed which is effected by firstly actuating the hydraulic cylinders 51 for displacing the cylinder 47 to its right end position according to FIG. 6. At this moment the outer edge of the collapsed mantle surface of the packaging material will to some extent expand radially outwardly by resilience beyond the forward edge of the cylinder 47. When the piston 45 is thereafter moved to the right according to FIG. 6 a distance somewhat larger than what is shown in FIG. 6 the piston portion 46 will be wholly drawn into the cylinder 47, but the collapsed packaging material will not intrude into the cylinder owing to the resilient expansion referred to above. Consequently, the packaging material will fall downwardly and can be collected in a device for this purpose. If desired, a special device can be provided for securing the complete removal of the compressed packaging material from the space between the feeding head 29 and the piston 45.

The unit 31 is now swung clockwise 90° and reaches again the position shown in FIG. 1 for receiving a new package in the manner already described, after the cylinder 47 and the piston 45 have returned.

The invention is of course not limited to the embodiment shown and described since the latter can be modified and varied in many different ways within the scope of the invention. Further, it should be pointed out that all the power and control means required for carrying out the abovementioned movements of the inherent units and details have not been shown in detail, since their construction and application do not pose any problems for the artisan. It is of course possible that all movements be controlled automatically one after the other by means of well-known mechanical and electronic control and regulation means in accordance with a predetermined program for every desired case.

The packaging material can roughly be of any desired type, e.g. iron plate, plastic foil, fibre material, etc.

Furthermore, the shifting of the emptying unit 31 can be effected in other ways than by swinging as in the embodiment shown.

The present invention is very suitable for application in machines for treating or processing plastic material, especially of the polyester type, but can of course be used for many other plastic materials, especially where there is a risk of emission of harmful substances from the plastic material during the treatment.

It appears from the above that the plastic material in the packages will have very limited possibilities to penetrate into the room and harmfully affect the work-people during the plastic processing operation. Upon the perforation of the package the plastic comes into contact with the air only for a very short moment between the release of the package by means of the pins 95 and 97 and the swinging down of the unit 31 to the emptying position according to FIG. 3. At the ejection of the compressed packaging material after the emptying operation remaining plastic material will made contact of short duration with the surrounding space, but the emission of harmful substances to the workroom can easily be prevented by suitable ventilation means.

Finally, it should be mentioned that the emptying of packages by deformation of the packages in a machine according to the invention can be effected in some cases without providing exit openings in advance by means of special means for perforation of the packaging material. The exit openings can in some cases be created merely by the internal overpressure of the plastic material, especially when using packages with relatively weak packaging material or packaging material which has merely been provided with weak lines where exit openings are to be created by the pressure of the plastic material.

What is claimed is:

1. A machine for injecting moulding or extruding plastic material which is available in packaged form, and which includes a feeding head with an extrusion nozzle, a feed channel for feeding plastic material to the nozzle, an emptying device for emptying a plastic material package and transferring the plastic material to said feed channel by deformation of the package after an exit opening for the plastic material has been provided in the packaging material, said device having an emptying cylinder for accommodating the package and a driven emptying piston movable in the emptying cylinder, characterized by an extrusion unit comprising an extrusion cylinder with an injection piston movable therein and a switch valve adapted to alternatively connect the extrusion cylinder to said feed channel and said extrusion nozzle for indirect feeding of material to the nozzle, and by means for moving the emptying cylinder away from the feeding head after complete emptying of the package in a direction away from the feeding head so that the deformed plastic material package resiliently expands and is set free, whereupon the emptying piston thereafter is moved away from the feeding head into the emptying cylinder so that the deformed package is no longer supported by said emptying piston or emptying cylinder for automatic removal of the deformed package.

2. A machine according to claim 1, characterized in that the inlet of said feed channel (23) is situated in said feeding head (29) against which said emptying cylinder (47) can be brought to tightly abut.

3. A machine according to claim 2, characterized in that the emptying cylinder (47) with the emptying piston (45) is shiftable between a charging position, in which a plastic material package can easily be introduced into the emptying cylinder, and an emptying position, in which the emptying cylinder (47) tightly abuts against the feeding head (29).

4. A machine according to claim 1, characterized in that the end of the emptying piston (45) acting against the plastic material package (71) has a portion (46) with reduced cross sectional area for the formation of a peripheral groove (55) between said portion and an inner wall of the emptying cylinder (47) which groove accomodates a mantle portion (77) of the deformed package.

5. A machine according to claim 3, characterized by a device for providing said exit opening in the package by perforation thereof before the emptying device is shifted into the emptying position.

6. A machine according to claim 5, characterized in that the device for providing said exit opening is combined with a device for the transfer of unopened packages from a take-off place to the emptying device in the loading position thereof.

7. A machine for the injection or extrusion of plastic material having injurious qualities and contained in a deformable package comprising:
   a support frame;
   an emptying unit including a body defining a space, an emptying piston movable in said space, an emptying cylinder for receiving a piston head portion of said emptying piston and means for movably mounting said emptying cylinder to said body;
   an injection unit having a feeding head including a feed channel, a valve, an outlet nozzle, an injection cylinder and an injection piston movable in said injection cylinder, said valve movable from a first position communicating said injection cylinder with said outlet nozzle and a second position communicating said feed channel with said injection cylinder;
   a gripping unit associated with said support frame for gripping and perforating a package containing plastic, said body being movable on said frame from a first position for receiving a package from said gripping unit to a second position which brings said emptying cylinder into alignment with said feeding head, said means for moving said emptying cylinder being operable to engage said emptying cylinder with said feeding head and communicating the interior of said emptying cylinder with said feed channel.

8. A machine according to claim 7, wherein said first position of said body orients a major axis of said emptying cylinder vertically and opening upwardly for receiving a package and said second position of said body orients said major axis horizontally, said body being mounted for rotation about a horizontal axis to said support frame.

9. A machine according to claim 8, wherein said means for moving said emptying cylinder with respect to said body comprise at least one piston and cylinder combination connected between said emptying cylinder and said body.

10. A device according to claim 8, wherein said feeding head includes a projecting portion having an external diameter substantially equal to an internal diameter of said emptying cylinder adjacent an end thereof for receiving said package whereby said emptying cylinder engages around said feeding head projection when said means for moving said emptying cylinder are operable to move said emptying cylinder in engagement with said feeding head.

11. A machine according to claim 10, wherein said gripping unit includes a body portion, a plurality of pressure boxes connected to said body portion and a puncturing piston movably mounted in each pressure box, said pressure piston being positioned to puncture and simultaneously carry a package.

* * * * *